United States Patent [19]
Curtis, Jr. et al.

[11] Patent Number: 5,656,786
[45] Date of Patent: Aug. 12, 1997

[54] OILFIELD TUBULAR INSPECTION METHOD AND APPARATUS

[75] Inventors: William W. Curtis, Jr., Houston; Kevin D. Logan, Humble; Michael K. Schoonover, Houston, all of Tex.

[73] Assignee: ICO, Inc., Houston, Tex.

[21] Appl. No.: 642,481

[22] Filed: May 3, 1996

[51] Int. Cl.⁶ .................................................. G01M 19/00
[52] U.S. Cl. ............................................................ 73/865.8
[58] Field of Search ........................... 73/622, 623, 865.8; 324/237, 240, 220, 221; 209/517, 518; 364/507; 346/33

[56] References Cited

U.S. PATENT DOCUMENTS

| | | | |
|---|---|---|---|
| 4,644,272 | 2/1987 | Janos | 324/240 |
| 4,787,549 | 11/1988 | Matay et al. | 209/518 |
| 5,520,060 | 5/1996 | Gysi et al. | 73/865.8 |

*Primary Examiner*—Robert Raevis
*Attorney, Agent, or Firm*—Browning Bushman

[57] ABSTRACT

A system 10 for elongate metal goods comprises automated tubular inspection equipment 12 within an inspection area 13 for initially inspecting goods, and particularly oilfield tubulars, and a monitor 32 within a prove-up area 30 for viewing inspection data. An inspection computer 16 electronically records the inspection data and cooperates with a prove-up computer 38 to verify that all flagged suspect tubulars have been tested. Prove-up data may be input to the prove-up computer either directly from test equipment 40 or through a keypad 36. The prove-up report generated by the computer 38 may be electronically transmitted in real time to a monitor 24 outside the prove-up area for viewing the prove-up report data. According to the method of the invention, the prove-up operator may display inspection data on the monitor 32 to facilitate the inspection of suspect tubulars within the prove-up area. The prove-up operator electronically inputs prove-up data to the computer 38, which generates both interim and final prove-up reports which are then electronically transmitted to an inspection office and, if desired, to the customer of the tubular inspection service. Real time prove-up reports substantially assist the inspection service company and the customer to control the inventory of tubulars shipped to the inspection area, to adjust inspection limits for the automated inspection equipment, and to facilitate invoicing and claim filings.

20 Claims, 1 Drawing Sheet

OILFIELD TUBULAR INSPECTION METHOD AND APPARATUS

FIELD OF THE INVENTION

The present invention relates to techniques for inspecting elongate metal goods. More particularly, this invention relates to automated techniques for initially inspecting oilfield tubulars to pass accepted tubulars and flag suspect tubulars, and for thereafter manually proving-up the flagged tubulars for acceptance or rejection. The invention provides for realtime inspection data to a proving operator, and generates reliable, cost-effective interim and final prove-up reports.

BACKGROUND OF THE INVENTION

Hydrocarbon recovery operators have long recognized that defective oilfield tubulars which fail in a well may cause significant damage. A defective tubular which fails prior to hydrocarbon recovery may need to be repaired downhole. The repair costs, while significant, may be nominal compared to the loss of revenue from the delays in starting production. On occasion, a defective tubular may sever during run-in, thereby damaging downhole tools and resulting in an expensive fishing operation. A tubular which leaks during production may not be easily detected, and the lost production and premature shutting in of the well may be very costly.

Accordingly, oilfield tubulars are commonly inspected to ensure that defects in tubulars do not exceed established limits, thereby significantly reducing or eliminating the likelihood of downhole failures in the tubulars. Oilfield tubulars are most commonly inspected at either a pipe storage yard or at the production steel mill, although tubulars may also be inspected at the rig site, if necessary. Automated inspection equipment typically includes ultrasonic inspection stations and/or magnetic inspection stations. Also, the I.D. and/or the O.D. of each tubular may be checked for flaws. Inspection data from each tubular joint is stored in a computer. At periodic intervals during the inspection operation, the inspection operation is halted and flag reports are output for the prove-up operations.

As a result of the automated inspection, "passed" tubulars are either stored in a passed storage area or are promptly shipped to the rig site for use in a well, while "flagged" tubulars are placed in a proving area, where a proving operator manually inspects the suspect tubulars with portable equipment and gauges. The limits set by the initial inspection equipment must be sufficiently narrow to ensure that no tubulars with defects outside established limits are passed. In many cases, however, flagged tubulars may be manually inspected and still passed, although care obviously must be taken to carefully inspect each suspect defect in a flagged tubular. Depending on the results of the proving operation, a flagged tubular is either passed, rejected for use as a prime oilfield tubular, or sent to a repair area for repair (e.g., grinding the area containing the defect) or removal of the defect (e.g., cutting off an end of the tubular to remove the defect then rethreading the cut off end). In the alternative, some defects may be repaired by the prover in the prove-up area.

In many cases, the prover begins manual inspection of a flagged or suspect tubular only knowing that a tubular has been flagged, and that suspect defects are at identified locations along the tubular. A great deal of time is thus normally necessary to locate and check every suspect defect in a flagged tubular. A tubular joint occasionally may have so many suspect defects, or one or more suspect defects cannot be located, so that the prover walks from the proving area to the inspection area and requests a graphic output from the automated inspection equipment for a particular tubular joint. Since the automated inspection operation must be terminated to provide that output, and since there are significant demands for high production from the cost-intensive inspection equipment, the inspection equipment operator frequently will not want to shutdown the inspection equipment to provide the output desired by the prover for a particular tubular joint.

Flagged tubulars are marked by the prover so that the joints are either passed, rejected, or sent to the repair area. The prover conventionally fills out a defect summary sheet listing the results of the inspection of each suspect defect in a flagged tubular joint. Defect summary sheets are turned over to a supervisor for generating interim and/or final prove-up reports. Prove-up reports are maintained by the inspection service company as a record of passed tubulars that were initially flagged by the inspection equipment in order to ensure high quality control standards. The results of the initial inspection, the final prove-up report, and the records relating to tubulars which were repaired or cut off are then used by the tubular inspection company to generate a final inspection report and invoice for the customer. The customer utilizes the generated prove-up reports to analyze the overall inspection operation, to determine if additional tubulars must be shipped to the inspection yard in order to have sufficient accepted tubulars for a particular job, to support payment to the inspection service company for the inspection, proving, and tubular repair services, and to file a claim with the tubular manufacturer for rejected tubulars.

Various problems have long existed in performing these inspection operations, and particularly in performing prove-up operations in a reliable and cost effective manner. Prove-up reports are expensive and time consuming to generate, and transcription errors can be made between the prove-up data sheets and the prove-up reports. The usefulness of prove-up reports to the customer is also limited due to delays between completion of the prove-up operation on a tubular and the availability of a prove-up report for that tubular to the customer.

The disadvantages of the prior art are overcome by the present invention, and improved techniques and equipment are hereinafter disclosed for enhancing both the reliability and cost effectiveness of the operations involving the inspection of oilfield tubulars.

SUMMARY OF THE INVENTION

According to a preferred embodiment of the invention, data from an automated tubular inspection operation is electronically stored for each of the elongate metal goods, such as a tubular joint, but is also available in realtime for electronic transmission to the prover. The prover thus has available in the prove-up area, upon request, a graphic output of the initial inspection report for each flagged tubular joint. By having this data readily available, the efficiency of the prove-up operation is significantly enhanced. Before manually inspecting suspect defects in a flagged tubular, the prover may view the inspection data to briefly analyze suspect defects, thereby reducing the time required to determine whether a particular defect is likely to be within or outside predetermined limits. The prover may also review all suspect defects for a particular tubular prior to conducting any prove-up operations on that tubular. Significant time savings are realized by first testing the most likely defect which will cause rejection of the entire tubular. Prove-up operations are thus significantly improved without affecting the output from the initial inspection equipment.

Those familiar with tubular inspection operations recognize that equipment used by provers must be both highly reliable and durable. Prove-up operations are frequently conducted in partially enclosed buildings, and prove-up personnel are not generally experienced in the use of sophisticated computer equipment. Also, at least some of the prove-up equipment does not provide an electronic output, or provides an analog output which must be visually measured and recorded by a prove-up operator.

A prove-up operator electronically records test data in the prove-up area for each flagged tubular joint. Test data may be input by the prover on a keyboard. Alternatively, data from test equipment used by the prover may be electronically transmitted from the test equipment directly to a prove-up computer. The electronically stored prove-up data is utilized to generate interim and/or final prove-up reports. The time and manpower required to generate prove-out reports from data sheets is thus avoided, and transcription errors between the data sheets and the prove-up reports are eliminated. By utilizing a modem connected to the prove-up computer, prove-up reports are available to either the inspection service company or, if desired, to a remotely located customer. By electronically recording test data for each flagged tubular, the likelihood of inadvertently failing to inspect a flagged tubular is reduced.

Realtime prove-up reports may be utilized by the customer to monitor passed tubulars, thereby more efficiently controlling the number of tubulars shipped to an inspection yard to fill a particular job while reducing the inventory of stored tubulars. By observing the prove-up data as it is recorded, the customer may also make adjustments to the initial tubular inspection limits, thereby reducing the number of flagged tubulars which will meet prove-up test limits. The realtime and final prove-up reports may also be used for more efficient invoicing and for filing of claims with the tubular manufacturer.

It is an object of this invention to provide an improved technique for inspecting elongate metal goods whereby initial inspection data on a tubular is readily available to the prove-up operator for review before conducting prove-up operations on that tubular. By making the initial inspection data available in realtime to the prove-up operator, inspection production is not adversely affected and the prove-up operations are significantly enhanced.

It is another object of the invention to provide improved equipment for electronically recording prove-up data in a prove-up area for elongate metal goods. Data may be input by a prove-up operator and both interim and final prove-up reports generated in realtime. More timely and reliable prove-up reports are thus available to the inspection service company and, if desired, to the customer.

It is a feature of this invention that the prove-up operations may be enhanced by reviewing tubular inspection data on tubulars generated just prior to conducting prove-up operations on those tubulars. Both the time required to test suspect defects on a tubular and the number of suspect defects which must be tested may be reduced.

It is also a feature of the invention that the electronically recorded prove-up data increases the certainty that all flagged tubulars are tested in a prove-up operation.

Still another feature of the invention is that the tubular inspection service company, upon approval by the customer, may alter the automated tubular inspection limits while a particular batch of tubulars is being initially inspected.

It is a significant advantage of the present invention that the time and manpower required to generate prove-up reports is significantly reduced. Also, transcription errors between the initially recorded prove-up data and the interim and final prove-up reports are effectively eliminated.

It is a further advantage of the present invention that both the tubular inspection service company and the customer may more easily reconcile invoicing and claims to the tubular production company utilizing realtime prove-up reports.

A significant advantage of the present invention is that the prove-up operations are less difficult according to the present invention compared to previous prove-up techniques, so that the prove-up operator is highly motivated to use the improved equipment and techniques of this present invention.

These and further objects, features, and advantages of the present invention will become apparent from the following detailed description, wherein reference is made to the figures in the accompanying drawing.

DETAILED DESCRIPTION OF THE PREFERRED EMBODIMENTS

Figure 1:
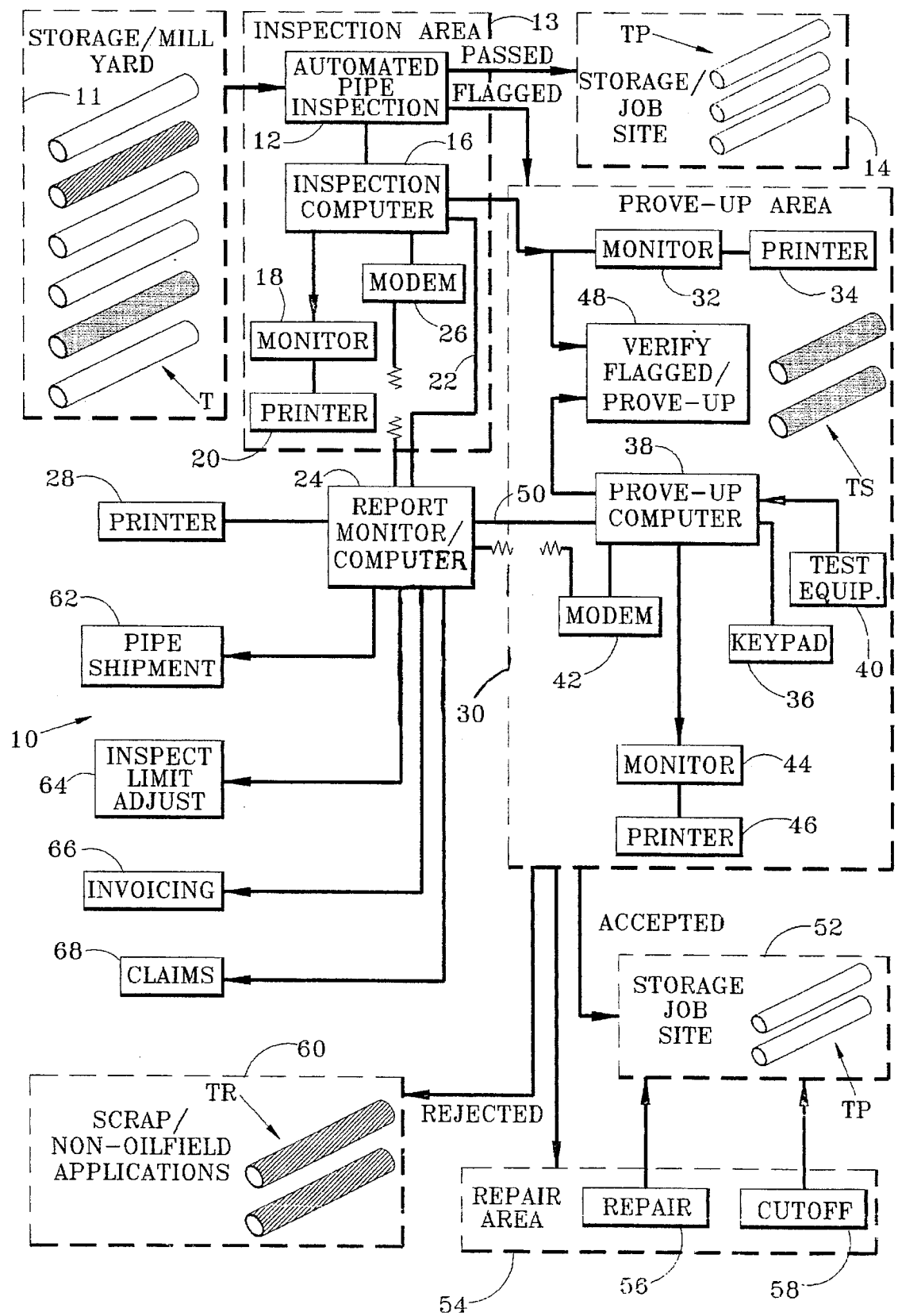
FIG. 1 is a block diagram of a pipe inspection operation according to the present invention, including a prove-up area electronically connected with an automated inspection computer, and a prove-up computer for generating interim and/or final prove-up reports in real time to the pipe inspection service company and the pipe customer.

The technique of the present invention provides, for the reliable testing of elongate metal goods, and particularly oilfield tubulars, and enables flagged or suspect goods to be more efficiently tested by a prove-up operator or prover. The invention also facilitates the accurate and timely generation of prove-up reports which may be transmitted in real time from the prove-up area to the offices of the testing company, which may be remote from the prove-up area. Both interim and final prove-up reports generated by a computer in the prove-up area may also be transmitted in real time to the testing company customer, who may use the real time reports to ship additional goods to the inspection area or to adjust test criteria and effectively reduce or increase the number of flagged or suspect tubulars.

As used herein, the term "oilfield tubular" refers to various types of elongate metal tubulars commonly used in oilfield operations, including drill pipe, casing, and tubing, including coiled tubing. Each of the tubulars has a nominal length which is typically approximately 30 feet (10 meters), although the length of tubulars within the same batch may vary by ten percent or more, as explained subsequently. The following description particularly refers to the inspection of pipe, although the testing, proving, and reporting activities as described below are applicable to other types of oilfield tubulars. FIG. 1 depicts in block form an exemplary system 10 according to the present invention for testing drill pipe. The drill pipe or other tubulars T are typically stored in one of numerous tubular storage yards 11 provided in areas of active oilfield operations, although the tubulars may also be inspected in a mill yard 11 adjacent the mill where the tubulars are manufactured. The term "elongate metal goods" refers to elongate metal bars or rods, elongate metal structural tubes, and oilfield tubulars.

The term "real time" is used in its conventional manner when referring to oilfield activities, and refers to the transmission of data from point A to point B instantaneously (or for data relating to a particular oilfield tubular within a short interval typically less than one second after the oilfield tubular clears the last inspection station) with the electronic entry or electronic generation of the data at point A, which is spaced from point B. The electronic transmission of reports according to the present invention from a computer in the prove-up area in real time to a monitor or printer at an office remote from the prove-up area is thus possible instantaneously with the generation of electronic signals within the computer which result in the report. The electronic transmission of reports to an office remote from the prove-up area can also be requested from the computer in the prove-up area at any time after the computer generates the electronic signals. Data input to the computer in the prove-up area may be instantaneously used to revise an interim prove-up report, and the interim prove-up report inclusive of the latest generated data may then be transmitted in real time to the remote office of the testing company or its customer. The term "monitor" is used in its general sense to refer to conventional means for displaying information either in electronic form on a computer screen, or in hard copy or other fixed record such as is commonly printed on paper. Information may thus be "displayed" temporarily on a computer screen, or may be permanently recorded either in hard copy on paper, on a computer disk, or on another conventional media.

The drill pipe T is initially inspected by automated pipe inspection equipment 12 located in an inspection area 13 adjacent the yard 11. The pipe inspection equipment may take various forms, such as that disclosed in U.S. Pat. Nos. 5,313,837 to Haynes, 4,487,072 to Livingston, and 4,217,782 to Pont. The automated pipe inspection equipment typically may include electromagnetic and/or ultrasonic sensors to detect transverse and longitudinal defects, and ultrasonic sensors for detecting internal defects and wall thickness defects. The pipe inspection equipment may also include gamma ray sensors which are commonly used to detect wall thickness defects. Exemplary defects in pipe are low pipe wall thickness and O.D. crack. Automated pipe inspection equipment 12 thus may pass pipe joints axially past various inspection stations while the pipe is rapidly moved axially through the equipment, typically at a rate of from 5 seconds to 150 seconds per joint of pipe. The pipe may be rotated as it is moved axially with respect to the stationary inspection stations, so that multiple stations for each type of sensor will inspect overlapping spiral pipe wall strips. Alternatively, the pipe may be moved axially and the inspection stations rotated, as disclosed in U.S. Pat. No. 5,313,837. Those skilled in the art will appreciate that presently available pipe inspection test equipment is highly automated and capital intensive. Accordingly, even brief stoppage and restarting of the equipment is avoided to maximize through-put of inspected pipe.

Pipe entering the inspection area 12 may be pre-coded or numbered, or may be coded or numbered by the pipe inspection equipment 12, so that each joint of pipe may thereafter be uniquely identified. The automatic pipe inspection equipment 12 sets narrow limits for passing acceptable pipe, since the results of a defect undetected by the inspection equipment may be very costly to the well operator. The inspection equipment thus separates the stored pipe T into passed pipe TP which meet the predetermined narrow inspection limits for each test conducted on that pipe, and flagged or suspect pipe TS. Passed pipe TP may be automatically color coded by the inspection equipment, and is moved from the inspection area 13 to an adjoining storage yard 14 which stores only passed pipe. Also, passed pipe may be immediately shipped to a job site, where it may then be stored on racks for promptly naming in a well.

Also located in the inspection area 13, and typically within a windowed compartment occupied by the test equipment operator, is an inspection computer 16 which electronically records, for each coded or numbered joint of pipe, the results of the inspection tests on that pipe joint from each of the inspection stations within the test equipment, and preferably from each of the multiple sensors within each inspection station. Inspection computer 16 thus electronically records tubular inspection data, for each joint of pipe, whether passed or flagged. This recorded tubular inspection data is then subsequently available for quality control purposes. Inspection data for a particular joint of pipe is carefully analyzed in the unlikely event that a pipe passed by the inspection equipment subsequently fails in a well, although that failure may not be due to a defect which should have been detected by the automated pipe inspection equipment 12. Also included within the inspection area, and typically within the inspection equipment operator compartment, is a conventional computer monitor 18 which displays to the test equipment operator a numerical or graphic output from one or more of the inspection stations, in real time, as the inspection process is being conducted on a particular pipe joint. The graphic or numerical tubular inspection data may also be output in hard copy for a particular joint of pipe or for multiple pipe joints from a printer 20 adjacent the monitor 18. Inspection data electronically stored within the inspection computer 16 may also be transmitted outside the inspection area 13 utilizing a conventional data conductor cable 22. If desired, the inspection data may be output utilizing telephone lines, radio waves or high frequency data transmission equipment utilizing a modem 26 electronically interconnected with the inspection computer 16.

Because the automated inspection equipment 12 must utilize narrow inspection limits to pass accepted pipe, pipe which does not pass initial inspection tests is flagged for subsequent manual testing in a prove-up area 30 adjacent the inspection area 13. Flagged or suspect pipe from the inspection equipment 12 is thus not inherently defective, and frequently a high percentage of flagged pipe will be subsequently manually inspected and thereafter passed or accepted for commingling with the pipe in the storage yard 14. It is important, however, that flagged or suspect pipe TS output from the inspection equipment 12 is moved to a prove-up area 30. Flagged pipe TS in the prove-up area 30 inherently must be kept separate from passed pipe TP in the storage yard 14, and from both accepted pipe TP in storage yard 52 and rejected pipe TR in the scrap yard 60 discussed subsequently.

Monitor 32 electronically connected to the inspection computer 16 is provided within the prove-up area 30. The prover thus has available a visual display of the complete results of the tests conducted by the equipment 12 on each or any flagged pipe. The prover thus has available, in real time, the same information on monitor 32 that the equipment operator may view on the monitor 18. This numerical or graphic information for a pipe joint, which may selectively be output in hard copy from printer 34, is particularly valuable to the prover within the prove-up area. The prover may request data for only a particular pipe joint or for several joints of pipe, and prove-up test operations are not interrupted to output test results for the prover from the computer 16 in the inspection area 13. These tests results enable the prover to more easily identify the one or more suspect defects which resulted in the pipe being flagged, so that defects may be more quickly and accurately identified and tested by the prover. If the test equipment provides circumferential or clock information regarding a suspect defect, that information may also be electronically supplied to the prover. Also, the test results for a particular pipe enable the prover, in certain applications, to first test a highly suspect defect in the middle area of an elongate pipe. A highly suspect defect, once tested by the prover, may result in the failure of the prove-up, so that the pipe may be quickly marked by the prover for scrap and other defects in the same pipe not tested. By studying the test results for a particular joint of pipe, the number of suspect defects which must be tested by the prover are thus reduced. The prover may also use the tubular inspection data displayed on monitor 32 to distinguish between closely adjacent defects on a flagged pipe, and to better understand why a particular defect in a certain quadrant and axial position along the pipe may have resulted in the pipe being flagged by the test equipment 12.

The data stored in the pipe inspection computer 16 will typically also include a log indicating the exact length of each pipe inspected. Accordingly, a tally report will total the length of all passed pipe, and will record the length of each identified pipe which is flagged for the prove-up operation. The recorded length of each pipe may be valuable to the prover in locating the specific flagged pipe. If the recorded pipe length is barely within minimal pipe length limits, e.g., 27 feet (9 meters), and a proved-up defect which can only be repaired by a cut-off operation is located, the pipe may be promptly rejected by the prover without taking the time to prove-up other suspect defects in the pipe.

The prover has available in the prove-up area 30 various types of test equipment 40 to manually inspect and test suspect defects in each flagged pipe. Typical test equipment includes an AC yoke, a magnet, and a depth gauge for testing external defects. An ultrasonic tester and wall gauge may be used by the prover for testing pipe seams and wall thickness. Equipment readily available to the prover also includes a grinder for grinding external defects to conduct more accurate tests and a spotlight for illuminating suspect defects. Prove-up test results may be electronically input by the prover to the prove-up computer 38 utilizing keypad 36. Alternatively, some test equipment 40 outputs, or may be easily modified to output, digital electronic information, which may be input directly from the test equipment 40 to the computer 38. As still a further alternative, the computer 38 may be supplied with information from the prover utilizing a state-of-the-art voice recognition system. By the prover merely engaging on an "enter" button on the test equipment after a particular suspect defect is tested, prove-up data may thus be directly input to the computer 38. In either case, the prover need not record prove-up data on defect summary sheets, then later turn that prove-up data over to a data entry operator for electronically inputting the data to a computer. Accordingly, transcription errors between the defect summary sheets and the entered data are obviated, and significant time and labor savings are realized.

For various purposes, the prover may want to review prove-up data previously input by the prover, both to ensure the accurate input of data and to compare prove-up data for one pipe with prove-up data previously entered for another pipe. Accordingly, monitor 44 is available for outputting to the prover of the prove-up test results for a particular pipe joint. If desired, the prover may also make a hard copy of the prove-up test for one or more pipe joints by activating the printer 46 interconnected with the monitor 44. The monitor 32 and the printer 34 as discussed above for outputting information from the inspection computer 16 may be similar to the monitor 44 and printer 46 for outputting data from the prove-up computer 38. As a practical matter, those skilled in the art will appreciate that the monitor 32 and the monitor 44 may in practice be the same monitor, and that similarly the printer 34 and the printer 46 may be the same printer. The prover may thus determine whether to monitor inspection data from the inspection computer 16 or monitor the prove-up data from the computer 38 by selectively calling up or requesting the desired information on a conventional keypad associated with either the monitor or the computer.

Computer 38, the keypad 36, the test equipment 40 and the monitors and printers available to the prover in the prove-up area 30 are relatively simple to use, and preferably utilize point-and-click technology to assist in the use of the equipment by the prover. The computer, the monitor, the printer, and data entry equipment are highly reliable and durable, so that the equipment may be reliably used by a prover in the relatively rugged environment of a prove-up area. A suitable prove-up computer is a 486, 100 MHZ computer with a 500 MB hard drive and 8 MB of ram. The computer may include either an integral or external VGA color display, and preferably an LCD display. The computer should be packaged in a NEMA-4 rated enclosure so it is sealed against liquid and dirt invasion.

A significant advantage of providing a prove-up computer 38 within the prove-up area 30 and having the prover electronically enter the prove-up data directly into the computer 38 is that the prover may verify, in real time, that all flagged or suspect pipe TS for a particular batch of inspected pipe output by the equipment 12 has been proved up. Communication is thus provided between inspection computer 16 and prove-up computer 38 that enables a verify flagged/prove-up operation 48 to be performed, preferably at computer 38 although optionally at computer 16. The verify operation 48 thus allows the prover to determine, for a particular batch of pipe inspected by equipment 12, the quantity of pipe and each specific pipe identified by a particular code or number that were output from the test equipment 12 for delivery to the prove-up area 30. As each flagged pipe is proved up, whether accepted or rejected, the prove-up data is entered in the computer 38. Accordingly, the prover may readily determine that, for example, 28 pipe joints were flagged, 27 pipe joints have been proven up, and that 1 pipe joint with an identifying code or ID number still needs to be located in the prove-up area 30 and proven up for the prove-up operation on that batch of flagged pipe to be complete.

Based on the results of the prove-up operation, the prover will typically mark pipe that is accepted, and differently mark pipe that is rejected. Flagged or suspect pipe that is accepted thus means that the suspect defects were all identified and checked, and that the defects were determined to be within acceptable predetermined limits. Accordingly, flagged pipe TS which is accepted may be shipped directly to a storage yard 52, or may be sent directly to a job site. Accepted pipe TP within the storage yard 52 may thus be commingled with the pipe in the storage yard 14. In practice, the storage yard 14 and the storage yard 52 may thus be a single yard. Pipe which is rejected by the prover is accordingly marked and is shipped to scrap yard 60. The pipe TR in the scrap yard may be used for limited oilfield applications which do not require prime pipe. Alternatively, rejected pipe may be used in non-oilfield applications, or may be returned to the mill for melting into new tubulars.

A third category of pipe is marked by the prover for delivery to repair area 54. Based on a prove-up test, the prover may determine that a defect in the pipe is outside of acceptable limits, but that the defect may be repaired by a conventional operation 56, such as a grinding operation to effectively remove the defect while leaving a sufficient pipe wall thickness. Alternatively, pipe sent to the repair area 54 may be subject to a cut-off operation 58, wherein a defect adjacent the threaded end of the pipe is severed from the remaining length of pipe, and the slightly shortened pipe is then rethreaded. If desired, pipe sent to the repair area 54 which is repaired or cut off may be passed back through the pipe inspection equipment 12 to ensure that the repaired pipe is satisfactory. In many cases, however, the repair operation is known to have an extremely high reliability. As previously noted, the prover may also repair some defects in a pipe while within the prove-up area, utilizing a portable grinder and a depth gauge. Accordingly, pipe repaired in the area 54 may be sent directly to the storage yard 52 and commingled with other accepted pipe.

Prove-up data within the prove-up computer 38 may be used to generate interim and final prove-up reports, which may be output by the prover on monitor 44 and printer 46. Electronically stored prove-up data, which preferably is continuously updated in an interim or final prove-up report, may also be transmitted along electrical data line 50 from the computer 38 in the prove-up area 30 to another computer or to a report monitor 24 each located outside the prove-up area. The report monitor 24 may be at the office of the pipe inspection company remote from the prove-up area 30, so that real time prove-up reports are available to various pipe inspection company representatives. If desired, the prove-up data may also be transmitted from the computer 38 to the remotely located monitor 24 utilizing telephonic, radio, or high frequency transmission techniques including a modem 42 adjacent the computer 38. It should be also understood that the computer within the offices of the pipe inspection service company and/or the report monitor within those offices may also receive tubular inspection data from the inspection computer 16 via electrical line 22 or modem 26 previously discussed. A pipe inspection service company representative remote from the inspection and prove-up operations may thus have ready access, in real time, to both tubular inspection data and prove-up data. The monitor 24 may thus display both an inspection report from computer 16 and prove-up report and defect summary sheet from computer 38. This data may also be permanently stored in the computer in the offices of the pipe inspection company, and may be output in hard copy by printer 28.

This real time information will be highly valuable in maintaining a good relationship with the customer, and in answering the customer's inquiries regarding the status of the inspection and prove-up operations. If desired, another report monitor remote from the inspection and prove-up operations may be located in the offices of the customer who has requested the inspection and prove-up operations. Pipe inspection company customers may thus also have access, in real time, to both inspection data from computer 16 and prove-up data and prove-up reports from the computer 38. In some applications, it may be desirable to limit access of certain information to the customer, in which case the data may first be transmitted to the report monitor 24 in the offices of the inspection company, and selected data then transmitted electronically by conventional means to a monitor in the offices of the customer.

Data displayed in real time on monitor 24 from the prove-up computer 38 is particularly useful to the pipe inspection company representative and to the customer or owner of the inspected pipe. In some applications, the customer will use this real time prove-up data to effect the shipment of additional pipe to the storage yard. For example, 1100 joints of a particular pipe size may be available in yard 11, and 1000 joints of that pipe may be necessary to properly complete an adjacent well. If the inspection reports from the computer 16 indicates that 600 joints out of the 1100 joints tested passed the automated inspection equipment 12, and the interim prove-up reports indicate that eighty-five percent of the flagged pipe joints are being accepted without repair, the shipment of additional pipe to the yard 11 will not be necessary if the eighty-five percent prove-up rate continues. On the other hand, if the interim prove-up reports indicate that only sixty percent of the flagged pipe joints are being accepted without repair, and the repairs in the prove-up report are of the type that may take days to complete, the customer may use the real time prove-up data to timely ship additional pipe of the required size to the yard 11 for inspection. Accordingly, both the pipe inspection company and the customer may use the real time prove-up data to effect or alter a pipe shipment operation 62, thereby substantially increasing the efficiency of the overall operation.

The pipe inspection company and/or the customer may also use real time prove-up reports on monitor 24 or the hard copy data output from the printer 28 to adjust the inspection limits for the equipment 12. For example, if the interim inspection reports indicate that seventy percent of the inspected pipe is being flagged by the equipment 12, but if the interim prove-up reports indicate that ninety percent of the flagged pipe is being accepted, that all pipe flagged due to pitting-type defects are accepted during the prove-up operation, and that one hundred percent of the prove-up pipe not accepted without repair is being rejected or is being marked for repair due to tool marks on the pipe, the limits within the inspection equipment 12 for defects related to pitting may be broadened somewhat so that a higher percentage of the inspected pipe is accepted by the automatic pipe inspection equipment 12. Similarly, inspection limits may be narrowed if, for some reason, it is apparent that defects which are barely outside of acceptable limits are flagged by the pipe inspection equipment 12, and those defects are proven up to be worse than anticipated. Inspection limits may thus be narrowed to ensure that defective pipe does not pass by the equipment 12. Any inspection limit adjustment operation 64 resulting from the real time prove-up report must be approved by the required high level personnel for both the pipe inspection company and the customer to ensure continued quality control.

The real time prove-up reports will also provide valuable assistance and reduce delays in the invoicing operation 66 from the pipe inspection company to the customer, and will reduce delays associated with the customer's approval of that invoice for payment. Delays in the order of days were typically associated with generating final prove-up reports from the written defect summary sheets generated by the prover, then forwarding that generated prove-up report to the customer along with an invoice. Final prove-up reports may now be forwarded in real time or within minutes after the prove-up operation is complete. Invoicing to the customer may occur simultaneous with the prove-up reports. Prompt acceptance of the invoice by the customer may be much more likely since the customer is continuously supplied with interim and final inspection and prove-up reports.

As another example of the value of real time prove-up reports, the pipe customer may use the reports to generate and file timely claims to the pipe manufacturer for flagged pipe which is rejected or is accepted only with repairs. A timely claim filing operation 68 based on the real time prove-up reports will result in prompt credit from the pipe manufacturer to the customer. The pipe manufacturer may then use this information to increase the efficiency of a pipe manufacturer representative traveling to the scrap yard 60 to the repair area 54 to verify the defects in the rejected pipe or the pipe which is accepted only after a repair operation. Those skilled in the art will readily appreciate additional benefits to both the pipe inspection company and to the customer resulting from the generation and prompt availability of interim and final prove-up reports.

The techniques accorded the present invention reduce prove-up time by assisting the prover in locating defects. By having the inspection reports available to the prover in the prove-up area, the prover has information to assist in determining if the particular defect is likely to be within acceptable limits or is likely to result in a rejected pipe. Also, substantial time savings are realized in generating prove-up reports. Prove-up data is electronically input to the prove-up computer by the prover, who may easily verify that all flagged pipe has been proved-up. Electronically generated prove-up reports, transmitted in real time outside the prove-up area may significantly assist both an inspection company representative and the customer.

Those skilled in the art will appreciate the utility and advantages of the present invention for testing oilfield tubulars. The techniques and equipment of the present invention may also be used to test other types of elongate metal goods, including elongate metal bars or rods having a cylindrical exterior surface (solid interior) or tubular goods used in structural applications.

Additional modifications and alterations to the embodiments and the methods as described herein should now be apparent to one skilled in the art in view of the foregoing disclosure. Various modifications may thus be made in accordance with the teachings of the present invention, which is not restricted to the embodiments discussed herein and shown in the accompanying drawings. The scope of the invention should thus be understood to include all embodiments within the following claims.

What is claimed is:

1. A method of inspecting elongate metal goods, comprising:
   automatically inspecting goods in an inspection area to pass accepted goods and to flag suspect goods;
   electronically recording inspection data;
   forwarding flagged suspect goods to a prove-up area separate from the inspection area to store the suspect goods;
   electronically forwarding the inspection data for flagged suspect goods to the prove-up area;
   displaying the electronically forwarded inspection data within the prove-up area for flagged suspect goods;
   testing flagged suspect goods within the prove-up area and electronically inputting prove-up data within the prove-up area for the flagged suspect goods; and
   generating a prove-up report based upon the electronically input prove-up data.

2. The method as defined in claim 1, further comprising:
   the prove-up report is generated in the prove-up area;
   electronically forwarding the prove-up report outside the prove-up area; and
   displaying the prove-up report outside the prove-up area.

3. The method as defined in claim 2, wherein the prove-up report is electronically forwarded in real time outside the prove-up area, and the prove-up report is displayed in real time outside the prove-up area.

4. The method as defined in claim 1, further comprising:
   outputting within the prove-up area a fixed record of the inspection data for flagged suspect goods.

5. The method as defined in claim 1, wherein the step of electronically recording inspection data occurs within the inspection area.

6. The method as defined in claim 5, further comprising:
   displaying the electronically recorded inspection data within the inspection area.

7. The method as defined in claim 1, further comprising:
   locating a prove-up computer within the prove-up area; and
   using the electronically input prove-up data and the inspection data for the flagged suspect goods, verifying that prove-up data has been input for all flagged suspect goods.

8. The method as defined in claim 1, further comprising:
   locating a prove-up computer within the prove-up area; and
   electronically transmitting the prove-up data from test equipment within the prove-up area to the prove-up computer.

9. The method as defined in claim 1, further comprising:
   entering prove-up data at a keyboard located within the prove-up area to input prove-up data.

10. The method as defined in claim 1, further comprising:
    the prove-up report is generated in the prove-up area;
    transmitting the prove-up report outside the prove-up area;
    displaying the prove-up report outside the prove-up area; and
    controlling the shipment of goods to the inspection area based upon the transmitted prove-up report.

11. The method as defined in claim 1, further comprising:
    the prove-up report is generated in the prove-up area;
    transmitting the prove-up report outside the prove-up area;
    displaying the prove-up report outside the prove-up area; and
    adjusting inspection limits for automatically inspecting goods based upon the transmitted prove-up report.

12. A method of inspecting oilfield tubulars, comprising:
    automatically inspecting tubulars within an inspection area to pass accepted tubulars and to flag suspect tubulars;
    electronically recording tubular inspection data within the inspection area;
    forwarding flagged suspect tubulars to a prove-up area separate from the inspection area to store the suspect tubulars;
    electronically transmitting data for flagged suspect tubulars to the prove-up area;
    displaying the electronically transmitted data for flagged suspect tubulars within the prove-up area;
    providing a prove-up computer within the prove-up area;
    testing flagged suspect tubulars within the prove-up area and electronically inputting prove-up data within the prove-up area for flagged suspect tubulars to the prove-up computer;
    generating a prove-up report within the prove-up computer based upon the electronically input prove-up data;
    electronically transmitting the prove-up report outside the prove-up area; and displaying the prove-up report generated by the prove-up computer outside the prove-up area.

13. The method as defined in claim 12, further comprising:

outputting within the prove-up area a fixed record of the tubular inspection data for flagged suspect tubulars.

14. The method as defined in claim 12, further comprising:

using the electronically input prove-up data to the prove-up computer, verifying that prove-up data has been input for all flagged suspect tubulars.

15. A system for inspecting elongate metal goods, comprising:

automated tubular inspection equipment within an inspection area for initially inspecting goods to pass acceptable goods and to flag suspect goods;

an inspection computer for electronically recording inspection data;

a first monitor within a prove-up area for displaying the inspection data for suspect goods, the prove-up area being separate from the inspection area for storing the suspect goods;

a data entry station within the prove-up area for electronically inputting inspection data for the suspect goods;

a prove-up computer for generating a prove-up report based upon the electronically input prove-up data; and a second monitor outside the prove-up area for displaying the prove-up report generated by the prove-up computer.

16. The system as defined in claim 15, further comprising:

the first monitor within the prove-up area also displays the electronically input prove-up data.

17. The system as defined in claim 15, further comprising:

a first printer within the prove-up area for outputting a fixed record of the inspection data.

18. The system as defined in claim 15, further comprising:

a modem for electronically forwarding the prove-up report from the prove-up computer to the second monitor.

19. The system as defined in claim 15, further comprising:

the inspection computer is within the inspection area; and an inspection monitor within the inspection area for displaying the inspection data.

20. The system as defined in claim 15, further comprising:

the prove-up computer is located within the prove-up area; and the second monitor is electronically supplied with the prove-up report in real time.

* * * * *